United States Patent
Chen et al.

(10) Patent No.: US 12,488,185 B2
(45) Date of Patent: Dec. 2, 2025

(54) METHOD AND APPARATUS FOR ACQUIRING INFORMATION, ELECTRONIC DEVICE AND STORAGE MEDIUM

(71) Applicant: BEIJING BAIDU NETCOM SCIENCE TECHNOLOGY CO., LTD., Beijing (CN)

(72) Inventors: Yushen Chen, Beijing (CN); Guangyao Han, Beijing (CN); Lei Su, Beijing (CN); Zeqing Jiang, Beijing (CN); Zhiping Li, Beijing (CN); Hongda Yue, Beijing (CN); Haiyang Xu, Beijing (CN); Ming Luan, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 439 days.

(21) Appl. No.: 18/050,580

(22) Filed: Oct. 28, 2022

(65) Prior Publication Data

US 2023/0081015 A1 Mar. 16, 2023

(30) Foreign Application Priority Data

Oct. 28, 2021 (CN) .......................... 202111266037.5

(51) Int. Cl.
*G06F 40/232* (2020.01)
*G06F 40/205* (2020.01)
(Continued)

(52) U.S. Cl.
CPC ............ *G06F 40/30* (2020.01); *G06F 40/205* (2020.01); *G06V 30/148* (2022.01); *G06V 2201/07* (2022.01)

(58) Field of Classification Search
None
See application file for complete search history.

(56) References Cited

U.S. PATENT DOCUMENTS

| 8,355,903 B1* | 1/2013 | Birnbaum | G06Q 10/10 |
| | | | 706/46 |
| 2010/0114561 A1* | 5/2010 | Yasin | G06F 16/355 |
| | | | 704/9 |

(Continued)

FOREIGN PATENT DOCUMENTS

| CN | 111428507 A | 7/2020 |
| CN | 112215008 A | 1/2021 |

(Continued)

OTHER PUBLICATIONS

Office Action issued for Chinese patent application No. 202111266037.5, mailed Jun. 30, 2023 (26 pages).

(Continued)

*Primary Examiner* — Seong-Ah A Shin
(74) *Attorney, Agent, or Firm* — Osha Bergman Watanabe & Burton LLP

(57) ABSTRACT

Disclosed are a method for acquiring information. The method includes: acquiring a file to be processed and an information type; recognizing at least one piece of candidate information related to the information type from the file to be processed; determining a target recognition feature and a semantic feature of each piece of candidate information, the target recognition feature is configured to describe a matching condition between the each piece of candidate information and the information type; and determining target information from the at least one piece of candidate information based on the target recognition feature and the semantic feature.

15 Claims, 7 Drawing Sheets

(51) Int. Cl.
*G06F 40/30* (2020.01)
*G06V 30/148* (2022.01)

(56) References Cited

U.S. PATENT DOCUMENTS

| | | | | |
|---|---|---|---|---|
| 2016/0179755 A1* | 6/2016 | Desai | ............... | G06F 40/284 |
| | | | | 715/256 |
| 2020/0065422 A1* | 2/2020 | Yan | ............... | G06N 3/082 |
| 2021/0383069 A1* | 12/2021 | Liu | ............... | G06F 17/16 |
| 2023/0186037 A1* | 6/2023 | Lee | ............... | G06N 20/00 |
| | | | | 704/2 |
| 2024/0028827 A1* | 1/2024 | Park | ............... | G06F 40/232 |

FOREIGN PATENT DOCUMENTS

| | | | |
|---|---|---|---|
| CN | 112507700 A | 3/2021 | |
| CN | 112507702 A | 3/2021 | |
| CN | 112990035 A | 6/2021 | |
| CN | 113536793 A | 10/2021 | |

OTHER PUBLICATIONS

Doleschal et al.; "Split-Correctness in Information Extraction;" arxiv.org, Cornell University Library; May 20, 2021; pp. 1-43 (43 pages).
Ilknur et al.; "Linking Entities through an Ontolohy Using Word Embeddings and Syntactic Re-renking;" BMC Bioinformatics; vol. 20; No. 1; Mar. 27, 2019 pp. 1-12 (12 pages).
Nasar et al.; "Named Entity Recognition and Relation Extraction;" ACM Computing Surveys; vol. 54; No. 1; Feb. 11, 2021; pp. 1-39 (39 pages).
Extended European Search Report issued in European Application No. 22204057.8 mailed on Feb. 17, 2023 (10 pages).

* cited by examiner

METHOD AND APPARATUS FOR ACQUIRING INFORMATION, ELECTRONIC DEVICE AND STORAGE MEDIUM

CROSS-REFERENCE TO RELATED APPLICATION

This application claims priority to Chinese Patent Application No. 202111266037.5 filed on Oct. 28, 2021, the disclosure of which is hereby incorporated by reference in its entirety.

TECHNICAL FIELD

The disclosure relates to a field of computer technologies, specifically to a field of artificial intelligence (AI) technologies such as deep learning (DL) and natural language processing (NLP), and particularly to a method and an apparatus for acquiring information, an electronic device and a storage medium.

BACKGROUND

Artificial intelligence (AI) is a subject that learns simulating certain thinking processes and intelligent behaviors (such as learning, reasoning, thinking, planning, etc.) of human beings by a computer, which covers both hardware-level technologies and software-level technologies. AI hardware technologies generally include technologies such as sensors, dedicated AI chips, cloud computing, distributed storage, big data processing, etc.; AI software technologies mainly include computer vision technology, speech recognition technology, natural language processing (NLP) technology and machine learning (ML), deep learning (DL), big data processing technology, knowledge graph (KG) technology, etc.

In the related art, key information of a file (a file may be for example a text file (for example, a Portable file Format (PDF) file) or a scanned copy) is acquired generally by a named entity recognition method and a reading comprehension method, which is susceptible to a file size.

SUMMARY

According to an aspect of the disclosure, a method for acquiring information is provided, and includes: acquiring a file to be processed and an information type; recognizing at least one piece of candidate information related to the information type from the file to be processed; determining a target recognition feature and a semantic feature of each piece of candidate information, the target recognition feature is configured to describe a matching condition between the each piece of candidate information and the information type; and determining target information from the at least one piece of candidate information based on the target recognition feature and the semantic feature.

According to an aspect of the disclosure, an electronic device is provided, and includes: at least one processor; and a memory communicatively connected to the at least one processor; the memory is stored with instructions executable by the at least one processor, the instructions are performed by the at least one processor, to cause the at least one processor to perform the method for acquiring information as described in the first aspect of the disclosure.

According to an aspect of the disclosure, a non-transitory computer readable storage medium stored with computer instructions is provided. The computer instructions are configured to cause a computer to perform the method for acquiring information as described in the first aspect.

It should be understood that, the content described in the part is not intended to identify key or important features of embodiments of the disclosure, nor intended to limit the scope of the disclosure. Other features of the disclosure will be easy to understand through the following specification.

BRIEF DESCRIPTION OF THE DRAWINGS

The drawings are intended to better understand the solution, and do not constitute a limitation to the disclosure.

DETAILED DESCRIPTION

The exemplary embodiments of the present disclosure are described as below with reference to the accompanying drawings, which include various details of embodiments of the present disclosure to facilitate understanding, and should be considered as merely exemplary. Therefore, those skilled in the art should realize that various changes and modifications may be made to the embodiments described herein without departing from the scope and spirit of the present disclosure. Similarly, for clarity and conciseness, descriptions of well-known functions and structures are omitted in the following descriptions.

Figure 1:
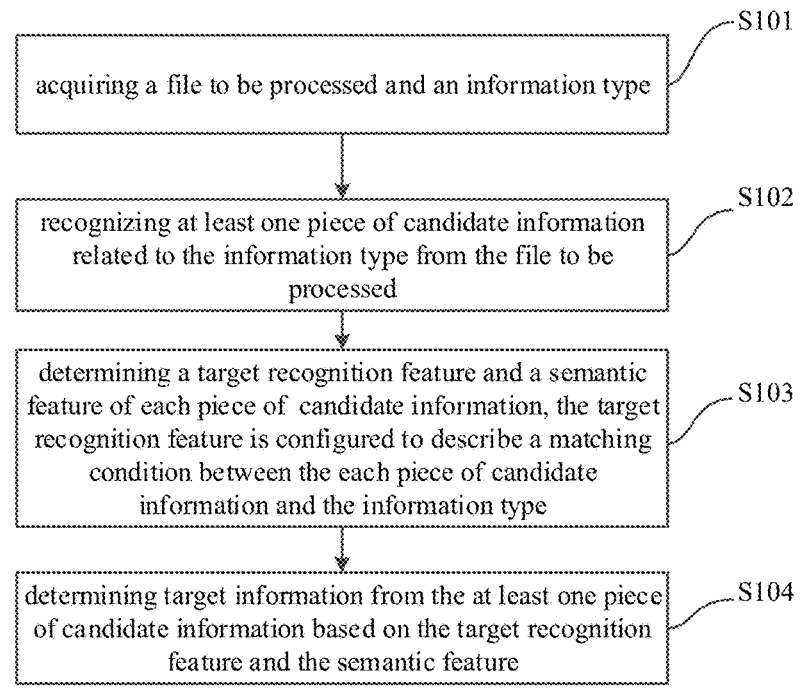
FIG. 1 is a flowchart of a method for acquiring information according to an embodiment of the disclosure.

FIG. 1 is a flowchart of a method for acquiring information according to an embodiment of the disclosure.

It needs to be noted that, an executive body of a method for acquiring information in the embodiment is an apparatus for acquiring information, and the apparatus may be implemented by means of software and/or hardware and may be configured in an electronic device, and the electronic device may include but is not limited to a terminal, a server, etc.

The embodiments of the disclosure relates to a field of artificial intelligence (AI) technologies such as deep learning and natural language processing.

Artificial Intelligence, abbreviated as AI in English, is a new science of technology that studies and develops theories, methods, technologies and application systems configured to simulate, extend and expand human intelligence.

Deep learning (DL) learns inherent law and representation hierarchy of sample data, and information obtained in the learning process is of great help in interpretation of data such as words, images and sound. A final goal of DL is that the machine may have analytic learning ability like human beings, and may recognize data such as words, images, sound, etc.

Natural language processing (NLP) studies theories and methods that may achieve effective communication between human and computers by natural language.

As illustrated in FIG. 1, the method for acquiring information includes following steps.

At S101, a file to be processed and an information type are acquired.

A file whose information is to be acquired currently may be referred to as the file to be processed. The file to be processed may, for example, a text file (for example, a Portable file Format (PDF) file) or a scanned copy. The file to be processed may be, for example, a contract file, a reference material file, which is not limited here.

In some embodiments, acquiring the file to be processed may be receiving a file input by a user (a contract file, or a reference data file) via a file input interface (the file input interface may be, for example, an interface configured on an electronic device, and may be configured to receive the file to be processed) directly as the file to be processed, which is not limited here.

In some embodiments, acquiring the file to be processed may be acquiring a plurality of images (for example, obtaining a plurality of scanned images by scanning text information), then splicing the plurality of images, and determining a file obtained by splicing the plurality of images as the file to be processed, which is not limited here.

The file to be processed may be configured to express file information, and the file information may be, for example, text information, picture information, or the like, which is not limited here.

The information expressed by the file to be processed may have different types which may be referred to as information types, and different files to be processed may have different information types.

For example, when the file to be processed is a contract file, the information types of the file to be processed may be, for example, Party A, Party B, a contract content, a contract signing date, etc., which is not limited here.

Optionally, in some embodiments, when the data volume of the file to be processed is less than or equal to a threshold, acquiring the file to be processed may be acquiring an initial file and obtaining at least one file to be processed by splitting the initial file based on the threshold. Splitting of the initial file with a large data volume is supported, and since the initial file is split, the data volume of a single file processing may be effectively reduced during the information acquiring process, and information acquisition of a file with any data volume may be supported, thereby effectively enhancing the applicability of acquiring information. In addition, after the at least one file to be processed is obtained by splitting the initial file, the at least one file to be processed may be processed at the same time, which effectively expands the application scope of acquiring information, and effectively assists in improving the efficiency of acquiring information.

An unprocessed file acquired at a beginning stage of the method for acquiring information may be referred to as the initial file. That is, acquiring the file to be processed may be acquiring the initial file and obtaining the plurality of files to be processed with a data volume less than or equal to the threshold by splitting the initial file.

For example, an acquired initial file is a 100-page PDF contract file, and the 100-page PDF contract file may be split into 100 files with page as unit in a data mapping manner. The 100 files obtained by splitting are taken as files to be processed.

It should be noted that, the file to be processed in the embodiment of the disclosure, or any other file that may involve user information, is acquired when the relevant user gives permission to use, and the acquisition process thereof conforms to the regulations of the related laws and regulations, and does not violate public order and good customs.

At S102, at least one piece of candidate information related to the information type is recognized from the file to be processed.

In the embodiment of the disclosure, after the file to be processed and the information type are acquired, at least one piece of information related to the information type may be recognized from the file to be processed. The at least one piece of information may be referred to as the candidate information, and the candidate information may be, for example, semantic, an entity, a character, a picture, etc., which is not limited here.

In some embodiments, recognizing the at least one piece of candidate information related to the information type from the file to be processed, may be recognizing at least one piece of entity information related to the information type from the file to be processed using an entity recognition method, and taking the at least one piece of entity information as the at least one piece of candidate information, which is not limited here.

In an embodiment, the at least one piece of candidate information related to the information type may be recognized from the file to be processed by using a pre-trained Global Pointer model. That is, at least one piece of candidate information output by the Global Pointer model may be obtained by inputting the file to be processed into the pre-trained Global Pointer model, which is not limited here.

The Global Pointer model is an artificial intelligence model based on rotation position coding (a relative position coding), and the model may process a text with a sequence length of a thousand or more, having a better text information acquisition effect.

Figure 2:
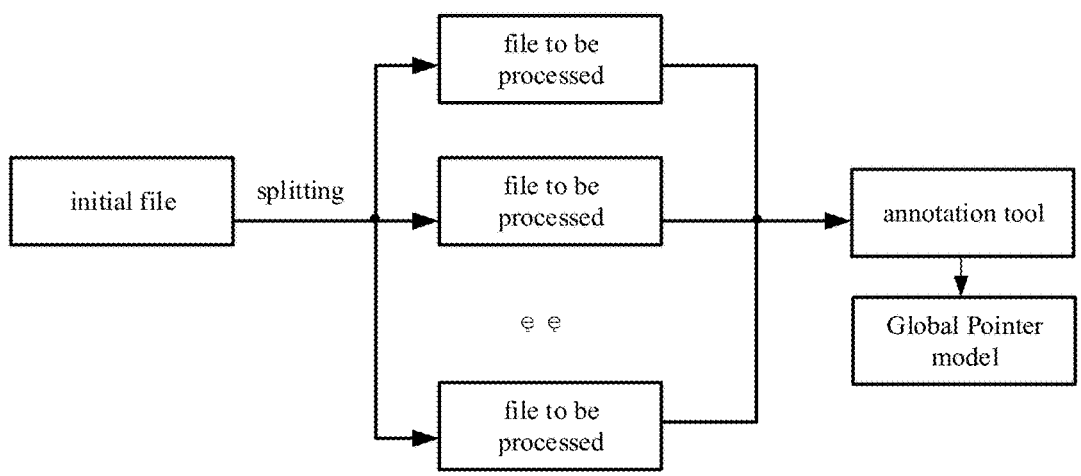
FIG. 2 is a flowchart of training a Global Pointer model in an embodiment of the disclosure.

In an embodiment of the disclosure, as illustrated in FIG. 2, FIG. 2 is a flowchart of training a Global Pointer model in an embodiment of the disclosure. Before the at least one piece of candidate information related to the information type is recognized from the file to be processed using the Global Pointer model, text segment of the file to be processed may be annotated using an annotation tool, so that the file to be processed may have a format required by training the Global Pointer model, and the annotated file to be processed is input into a Global Pointer model. For example, the format may be as follows.

{["text1", [start11, end11, entity1], [start12, end12, entity2], . . . ], ["text2", [start21, end21, entity1], [start 22, nd22, ntity2], . . . ], . . . }, where, "text" is a text segment of the file to be processed, "start" is a position index of a start of an entity, and "end" is a position index of an end of an entity.

Optionally, in some embodiments, recognizing the at least one piece of candidate information related to the information type from the file to be processed, may be recognizing at least one candidate information related to the information type from the at least one file to be processed in a parallel processing manner. Since the one or more files to be processed are recognized simultaneously in a parallel processing manner, the recognition efficiency of the candidate information may be improved to a great extent while the recognition effect of candidate information is effectively guaranteed, so that the method for acquiring information may be effectively adapted to an application scene with a higher acquisition efficiency requirement.

Parallel processing is a computing method capable of performing two or more processings simultaneously in a computer system. Parallel processing may work on different aspects of the same program simultaneously. The main purpose of parallel processing is to save time for solving large and complex problems. In order to use the parallel processing, a program needs to be parallelized first, that is, each part of the work is allocated to different processing processes (threads). In an embodiment of the disclosure, the at least one piece of candidate information related to the information type may be recognized from the corresponding file to be processed by different processing processes (threads).

As illustrated in FIG. 2, recognizing the at least one piece of candidate information related to the information type from the file to be processed in the parallel processing manner may be as follows. The file to be processed is split into a plurality of files to be processed, and parallel processing is performed on the plurality of files to be processed. That is, each of the plurality of files to be processed may be regarded as one training data, and parallel and independent inference may be performed on the plurality of files to be processed separately to obtain multiple pieces of candidate information related to the information type output by the Global Pointer model, which is not limited here.

At S103, a target recognition feature and a semantic feature of each piece of candidate information are determined, the target recognition feature is configured to describe a matching condition between each piece of candidate information and the information type.

A feature configured to describe the matching condition between the candidate information and the information type may be referred to as a target recognition feature. That is, the target recognition feature may be a matching condition between the information type and candidate information recognized during recognizing the file to be processed. The matching condition may be, for example, a matching result indicating whether match with each other, or a matching degree, which is not limited here.

For example, the target recognition feature may be, for example, a matching degree value between the candidate information and the information type, which is not limited here.

In some embodiments, determining the target recognition feature of the candidate information may be determining a matching degree between the candidate information and the information type. For example, determining the target recognition feature of the candidate information may be determining a similarity degree between the candidate information and the information type, and taking the similarity degree as the matching degree between the candidate information and the information type, and taking the matching degree as the target recognition feature of the candidate information. Optionally, determining the target recognition feature of the candidate information may be: inputting the candidate information and the information type into a pre-trained matching model, obtaining a matching degree between the candidate information and the information type output by the pre-trained matching model, and taking the matching degree as the target recognition feature of the candidate information, which is not limited here.

A feature configured to describe semantic of the candidate information may be referred to as a candidate semantic feature, and the candidate semantic feature may be, for example, semantic content, contextual semantic, semantic of a previous part, semantic of a subsequent part of the candidate information, etc., which is not limited here.

The semantic feature may be presented in a form of a feature representation vector, and the feature representation vector may be obtained by: obtaining an initial semantic feature by performing semantic feature parsing on the candidate information, and performing vectorization processing by mapping the initial semantic feature to a vector space, to obtain a vector representation in the vector space, the vector representation being capable of representing the semantic feature of the candidate information, then the vector representation is determined as a candidate semantic feature.

The semantic feature may also be presented in the form of a text, a picture, etc., which is not limited here.

In some embodiments, the candidate information may be input into a pre-trained feature extraction model to obtain the candidate semantic feature output by the feature extraction model, or the semantic feature of the candidate information may be determined in any other possible manner, which is not limited here.

At S104, target information is determined from the at least one piece of candidate information based on the target recognition feature and the semantic feature.

In some embodiments, determining the target recognition information from the at least one piece of candidate information based on the target recognition feature and the semantic feature may be as following. Target information output by a neutral network model is obtained by inputting the target recognition feature, the semantic feature and the at least one piece of candidate information into the pre-trained neural network model, which is not limited here.

In some embodiments, determining the target recognition information from the at least one piece of candidate information based on the target recognition feature and the semantic feature may be: directly taking the candidate information corresponding to the target recognition feature and the semantic feature as the target information when the target recognition feature and the semantic feature satisfy a preset condition (the condition may be adaptively configured based on the actual service obtaining requirement), which is not limited here.

In the embodiment, the file to be processed and the information type are acquired, and at least one piece of candidate information related to the information type is recognized from the file to be processed, and the target recognition feature and the semantic feature of each piece of candidate information are determined, the target recognition feature is configured to describe the matching condition between the candidate information and the information type, and the target information is acquired from the at least one piece of candidate information based on the target recognition feature and the semantic feature, thereby effectively enhancing the applicability of the method for acquiring information.

Figure 3:
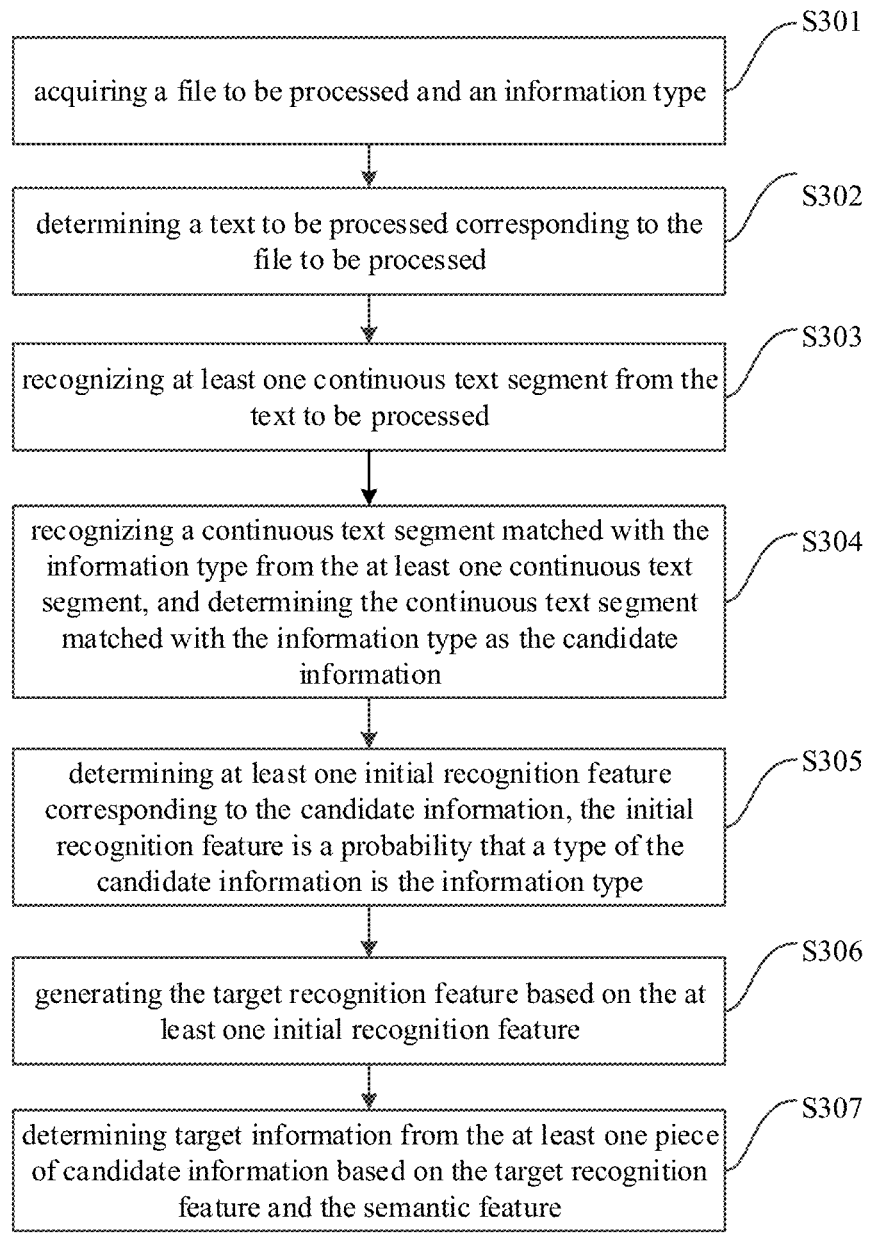
FIG. 3 is a flowchart of a method for acquiring information according to an embodiment of the disclosure.

FIG. 3 is a flowchart of a method for acquiring information according to an embodiment of the disclosure.

As illustrated in FIG. 3, the method for acquiring information includes following.

At S301, a file to be processed and an information type are acquired.

The description of S301 may refer to the above embodiment, which will not be repeated here.

At S302, a text to be processed corresponding to the file to be processed is determined.

The file to be processed may have a corresponding text content, and the text content may be referred to as the text to be processed.

For example, when the file to be processed is a contract file, the file to be processed may be a contract text, and the contract text may be, for example, a main body of the contract, a contract name, a contract signing date, etc., which is not limited here.

In the embodiment of the disclosure, determining the text to be processed corresponding to the file to be processed may be: obtaining a plurality of texts corresponding to the file to be processed by performing text parsing on the file to be processed, and taking the plurality of texts together as the text to be processed.

At S303, at least one continuous text segment is recognized from the text to be processed.

The text to be processed may have a plurality of continuous text segments, and the text segments may be referred to as the continuous text segment, and a continuous text segment may be a sentence with a complete language structure, a vocabulary and a paragraph in the text to be processed, which is not limited here.

For example, when the text to be processed is a contract text, the continuous text segments may be "The contract comes into effect as of the signing date", "Party B: Li Ming", and the like, which is not limited here.

At S304, a continuous text segment matched with the information type is recognized from the at least one continuous text segment, and the continuous text segment matched with the information type is determined as the candidate information.

In an embodiment of the disclosure, after the at least one continuous text segment is recognized from the text to be processed, matching may be performed on the at least one continuous text segment based on the information type, and at least one continuous text segment obtained by the matching is taken as the candidate information. Generally, the information needing to be recognized in an information acquisition scene is information including complete semantics, the at least one continuous text segment in the text to be processed is taken as the candidate information in the embodiments of the disclosure, which may effectively consider the actual application requirement of acquiring information, so that the candidate information may be configured to represent continuous text information, and the noise interference of discontinuous information on information acquisition may be timely removed, thus the semantic continuity and accuracy of the candidate information may be guaranteed, the pertinence and efficiency of information acquisition may be improved, and the semantic representation effect of the candidate information may be effectively improved.

For example, continuous text segments are "the contract shall be established as of the signing date", "Li Ming", "Oct. 20, 2021", recognizing the continuous text segment matched with the information type from at least one continuous text segment may be: recognizing the continuous text segment (Li Ming) matched with the information type (Party B) from the at least one continuous text segment, and recognizing the continuous text segment (Oct. 20, 2021) matched with the information type (a signing date), and the above continuous text segments "Oct. 20, 2021". Then, "Li Ming" matched with the corresponding information types respectively are together taken as the candidate information, which is not limited here.

Optionally, the continuous text segment matched with the information type may be recognized from the at least one continuous text segment in any other possible manner, and the recognized continuous text segment may be taken as the candidate information, such as a model matching manner, a similarity degree matching manner, which is not limited here.

Optionally, in some embodiments, recognizing the continuous text segment matched with the information type from the at least one continuous text segment, may include: determining at least one semantic weight value respectively corresponding to the at least one continuous text segment, and obtaining at least one sorted continuous text segment by sorting the at least one continuous text segment based on the at least one semantic weight value, determining a reference number based on the information type, and extracting the reference number of top sorted continuous text segments matched with the information type from the at least one sorted continuous text segment. The semantic weight value may be configured to describe a semantic weight condition of the continuous text segment in the whole text to be processed, thus, when the continuous text segment is determined in combination with the semantic weight value corresponding to the continuous text segment, the continuous text segment matched with the information type may be recognized from the plurality of continuous text segments more accurately, which improves the quality of the extracted continuous text segment, increases a hit probability of recognizing a continuous text segment as the target information, and reduces the data search range of target information recognition. In addition, continuous text segment with a lower weight value may be effectively filtered in advance, which effectively reduces the consumption of computing resources, assists in enhancing the efficiency of information acquisition, and improves the hit effect of target information.

A quantization value for describing the at least one semantic weight corresponding to the at least one continuous text segment may be referred to as a semantic weight value, and the semantic weights may be configured to describe importance degrees of the plurality of continuous text segments.

The semantic weight may be pre-calibrated, or may be dynamically determined according to contextual information of the text to be processed during the information acquisition process, which is not limited here.

Optionally, in some embodiments, determining a plurality of semantic weight values respectively corresponding to the plurality of continuous text segments may include: determining an occurrence number of each continuous text segment in the text to be processed, and determining a semantic weight value corresponding to each continuous text segment based on the occurrence number one of each continuous text segment. Therefore, the semantic weight value may be targeted to represent a reliability degree of the continuous text segment, so that when the continuous text segment matched with the information type is recognized from the plurality of continuous text segments by referring to the reference semantic weight value, interference generated by other subjective factors on recognizing the continuous text segment may be avoided, and the objectivity and reliability of the recognized continuous text segment may be effectively improved.

A value configured to describe the occurrence number of the continuous text segments in the text to be processed may be referred to as a number value.

In some embodiments, determining the occurrence number of one continuous text segment in the text to be processed may be as following. A file to be processed is traversed, and when a continuous text segment in the file to be processed is recognized, an occurrence number of the recognized continuous text segment may be accumulatively counted to obtain a corresponding number value. The number value may be taken as a semantic weight value corresponding to the recognized continuous text segment, which is not limited here.

In some embodiments, the at least one semantic weight value respectively corresponding to the at least one continuous text segment may be calculated using an analytic hierarchy process method, or may be determined by any other possible methods, which is not limited here.

In an embodiment of the disclosure, when the at least one semantic weight value respectively corresponding to the at least one continuous text segment is determined, a plurality of continuous text segments may be sorted based on the semantic weight value. For example, a plurality of continuous text segments corresponding to the semantic weight values may be sorted based on the size of the semantic weight values, and the plurality of sorted continuous text segments may be taken as sorted continuous text segments.

In an embodiment of the disclosure, when at least one sorted continuous text segment is determined, a reference number (a reference number may be adaptively determined based on the information type in combination with setting rules) of top sorted continuous text segments may be selected from the at least one sorted continuous text segment, and taken as the candidate information.

At S305, at least one initial recognition feature corresponding to the candidate information is determined, the initial recognition feature is a probability that a type of the candidate information is the information type.

The probability may be configured to describe a probability that the type of the candidate information initially determined is the information type, and the initial recognition feature may be measured by a recognition probability corresponding to each character in the candidate information.

In an embodiment of the disclosure, determining the at least one initial recognition feature corresponding to the candidate information may include: determining a probability that the type of the candidate information is the information type, and taking the probability as an initial recognition feature corresponding to candidate information.

Optionally, determining the at least one initial recognition feature corresponding to the candidate information may include: determining a plurality of probabilities that a plurality of characters corresponding to the candidate information are the information type, and taking the probabilities together as the initial recognition feature corresponding to the candidate information, which is not limited here.

At S306, the target recognition feature is generated based on the at least one initial recognition feature.

In some embodiments, generating a target recognition feature based on the at least one initial recognition feature may include: performing sorting processing on a plurality of initial recognition features based on their corresponding probabilities (for example, sorted in a descending order), and selecting a set number of (the set number may be adaptively configured based on the actual service scene, which is not limited here) initial recognition features from the plurality of sorted initial recognition features as the target recognition feature. Optionally, generating a target recognition feature based on the at least one initial recognition feature may include: setting a certain probability threshold, the probability threshold may be adaptively configured based on the actual service scene, which is not limited here, and determine an initial recognition feature with a probability greater than or equal to the probability threshold in the plurality of initial recognition features as the target recognition feature, which is not limited here. In a case there is one initial recognition feature, the initial recognition feature can be directly determined as the target recognition feature.

In some embodiments of the disclosure, the at least one initial recognition feature corresponding to the candidate information is first determined, then the target recognition feature is generated based on the at least one initial recognition feature. The initial recognition feature may be configured to describe a probability that the type of the candidate information is the information type, thus, when the target recognition feature is generated based on the initial recognition feature, the preferable initial recognition feature may be selected based on the probability, thereby effectively improving the possibility for referring to the target recognition feature in the information acquisition task, enhancing the effect of the target recognition feature for representing the corresponding candidate information, and assisting in determining more accurate target information.

At S307, target information is determined from the at least one piece of candidate information based on the target recognition feature and the semantic feature.

The description of S307 may refer to the above embodiment, which will not be repeated here.

In the embodiment, the file to be processed and the information type are acquired, the text to be processed corresponding to the file to be processed is determined, and the continuous text segment matched with the information type is recognized from the at least one continuous text segment and taken as the candidate information, which may timely remove the noise interference of discontinuous information on information acquisition, guarantee the semantic continuity and accuracy of the candidate information, improve the pertinence and efficiency of information acquisition, and effectively improve the semantic representation effect of the candidate information. In addition, the at least one initial recognition feature corresponding to the candidate information is determined, and the target recognition feature is generated based on the at least one initial recognition feature, thus the preferable initial recognition feature may be selected based on the probability, thereby effectively improving the possibility for referring to the target recognition feature in the information acquisition task, enhancing the effect of the target recognition feature for representing the corresponding candidate information, and assisting in determining more accurate target information.

Figure 4:
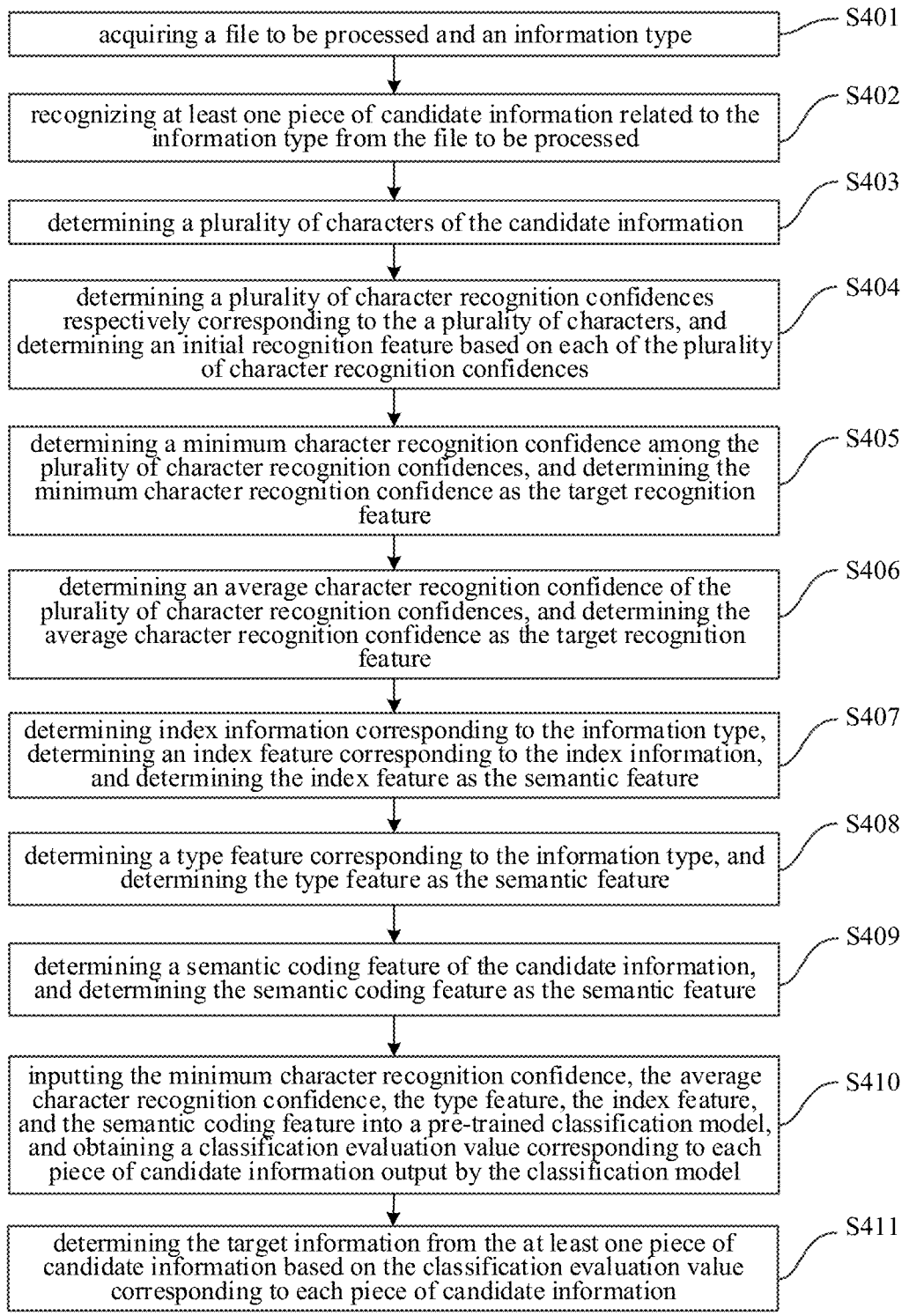
FIG. 4 is a flowchart of a method for acquiring information according to an embodiment of the disclosure.

FIG. 4 is a flowchart of a method for acquiring information according to an embodiment of the disclosure.

As illustrated in FIG. 4, the method for acquiring information includes:

At S401, a file to be processed and an information type are acquired.

At S402, at least one piece of candidate information related to the information type is recognized from the file to be processed.

The description of S401 to S402 may refer to the above embodiments, which will not be repeated here.

At S403, a plurality of characters of each piece of candidate information are determined.

In the embodiment of the disclosure, the plurality of characters of each piece of candidate information may be determined after the at least one piece of candidate information related to the information type is recognized from the file to be processed.

For example, the information type is a contract name, recognizing a plurality of candidate information related to the contract name from the file to be processed may be recognizing "construction project contract" from a contract file. In this case, determining the plurality of characters of the candidate information may splitting the candidate information in a character unit, to obtain a plurality of characters ("construction", "project", "contract").

At S404, a plurality of character recognition confidences respectively corresponding to the plurality of characters are determined, and an initial recognition feature is determined based on each of the plurality of character recognition confidences.

The plurality of characters of the candidate information may respectively correspond to different recognition confidences. A recognition confidence may be referred to as a character recognition confidence, which may be configured to describe a reliability of the character recognition, a high character recognition confidence indicates a high reliability of the character recognition, and a low character recognition confidence indicates a low reliability of the character recognition.

In the embodiment of the disclosure, when the plurality of characters of the candidate information are determined, the plurality of character recognition confidences corresponding to the plurality of characters may be determined and taken as the initial recognition features respectively. The plurality of recognition confidences of the plurality of characters are taken as the plurality of initial recognition features respectively, the initial recognition features may accurately represent a recognition condition of the plurality of characters, which effectively improve a possibility for referring to the initial recognition features, thereby having a more accurate information acquisition effect when performing a subsequent method for acquiring information based on the initial recognition features.

In the embodiment of the disclosure, determining the character recognition confidences corresponding to characters may include obtaining recognition confidences corresponding to the characters by recognizing each character using an optical character recognition (OCR) method, to obtain the character recognition confidence of each of the plurality of characters.

For example, different recognition confidences corresponding to the plurality of characters of the plurality of candidate information may be obtained when the plurality of characters of the plurality of candidate information are recognized by an OCR method, for example, candidate information 1: {" 多恼痛信部门": [0.55, 0.55, 0.54, 0.99, 0.98, 0.98] },
candidate information 2: {" 移云通信部门": [0.99, 0.97, 0.99, 0.99, 0.99, 0.99] }, and
candidate information 3: {" 禾力通信部门": [0.78, 0.45, 0.99, 0.99, 0.99, 0.99] }.

It should be noted that, the above Chinese characters are examples in a Chinese character recognition scene.

At S405, a minimum character recognition confidence among the plurality of character recognition confidences is determined, and the minimum character recognition confidence is determined as the target recognition feature.

When the plurality of characters are recognized by the OCR method, due to the existence of light, folding, flipping, clarity, seal shielding and the like, the recognition confidences of some characters may be low, and the character recognition confidence with the smallest value in the plurality of character recognition confidences may be referred to as the minimum character recognition confidence.

In an embodiment of the disclosure, the minimum character recognition confidence among the plurality of character recognition confidences may be determined based on a pre-trained sorting model. For example, the plurality of character recognition confidences may be input into the pre-trained sorting model, and the minimum character recognition confidence output by the sorting model may be obtained and taken as a target recognition feature, which is not limited here.

At S406, an average character recognition confidence of the plurality of character recognition confidences is determined, and the average character recognition confidence is determined as the target recognition feature.

An average value of the character recognition confidences corresponding to the plurality of characters may be referred to as the average character recognition confidence.

In the embodiment of the disclosure, determining the average character recognition confidence of the plurality of character recognition confidences may include: determining a plurality of character recognition confidences respectively corresponding to the plurality of characters, determining an average value of the plurality of character recognition confidences corresponding to the plurality of characters, and determining the average value obtained as the average character recognition confidence of the characters, which is not limited here.

When the average character recognition confidence of the plurality of characters is determined, the average character recognition confidence may be taken as the target recognition feature. The minimum recognition confidence may be configured to describe a probability of character recognition errors, and the average recognition confidence may be configured to describe an average distribution of a character feature space, so that when the minimum recognition confidence and the average recognition confidence are taken as the target recognition features, the target recognition features may accurately and comprehensively represent a character recognition condition, which may effectively improve the performance of target recognition features.

It should be noted that, S405 and S406 are optional steps. That is, either one or both of them can be executed, and the execution order of S405 and S406 may be changed. For example, S405 may be executed after S406, or S405 and S406 may be executed simultaneously.

At S407, index information corresponding to the information type is determined, and an index feature corresponding to the index information is determined, the index feature is taken as the semantic feature.

The information type may include some index-related information, and the index-related information may be referred to as the index information, and the index information may be for example an index table, which is not limited here.

In an embodiment of the disclosure, when multiple pieces of candidate information related to the information type are determined, a data mode (Schema) may be designed based on the multiple pieces of candidate information related to the information type. Schema may be configured to store the multiple pieces of candidate information related to the information type, and Schema may be referred to as an index table corresponding to the information type, which is not limited here.

A feature configured to describe the index information corresponding to the information type may be referred to as an index feature, and the index feature may be for example an index value, which is not limited here.

For example, an index value corresponding to the information type may be an index position of the information type in Schema, which is not limited here.

In an embodiment of the disclosure, after the index information corresponding to the information type is determined, a corresponding index value in the index table may be determined, and taken as the index feature.

For example, an index table constructed is: ["Party A", "Party B", "a signing date"], it may be determined that an index value corresponding to "Party A" in the index table is 0, an index value corresponding to "Party B" in the index table is 1, and an index value corresponding to "a signing date" in the index table is 2, and the above index values determined are taken as index features corresponding to the index information.

At S408, a type feature corresponding to the information type is determined, and taken as the semantic feature.

A feature configured to describe the information type may be referred to as a type feature, and the type feature may be, for example, a semantic feature and a correlation feature of the information type, which is not limited here.

At S409, a semantic coding feature of the candidate information is determined, and taken as the semantic feature.

A feature configured to describe semantic coding information of the candidate information may be referred to as a semantic coding feature, and the semantic coding feature may be, for example, a semantic coding vector, which is not limited here.

In an embodiment of the disclosure, determining the semantic coding feature of the candidate information may include: inputting the candidate information corresponding to the information type into a pre-trained bidirectional encoder representations from transformer (BERT) model to obtain a 768-dimensional semantic coding vector output by the BERT model. The semantic coding vector may be referred to as the semantic coding feature, or the semantic coding feature of candidate information may be determined in other possible ways, which is not limited here.

In the embodiment, the index information corresponding to the information type is determined, and the type feature corresponding to the information type and the index feature corresponding to the index information are determined, and then the semantic coding feature of the candidate information is determined, and the type feature, the index feature and the semantic coding feature are taken as semantic features, so that semantic features may comprehensively represent the candidate information from multiple dimensions, thus multi-dimensional information of the candidate information can be fully considered, thereby effectively guaranteeing that information acquired may be provided to a delivery indicator in the process of performing a method for acquiring information subsequently.

It should be noted that, S407-S409 are optional steps. That is, either one or both of them can be executed, and the execution order of S407-S409 may be changed. For example, S407-S409 may be executed in other orders, or S407-S409 may be executed simultaneously.

At S410, the minimum character recognition confidence, the average character recognition confidence, the type feature, the index feature, and the semantic coding feature are input into a pre-trained classification model, and a classification evaluation value corresponding to each piece of the candidate information output by the classification model is obtained.

For example, the pre-trained classification model may be an Extreme Gradient Boosting (XGBoost) model, or, may be any other artificial intelligence model capable of performing a method for acquiring information, which is not limited here.

A value output by the classification model may be referred to as the classification evaluation value. The classification evaluation value may be configured to describe a reliability degree of the candidate information corresponding to the classification evaluation value. The higher the classification evaluation value, the higher the reliability degree of the candidate information corresponding to the classification evaluation value is, and the lower the classification evaluation value, the lower the reliability degree of the candidate information corresponding to the classification evaluation value is, which is not limited here.

Figure 5:
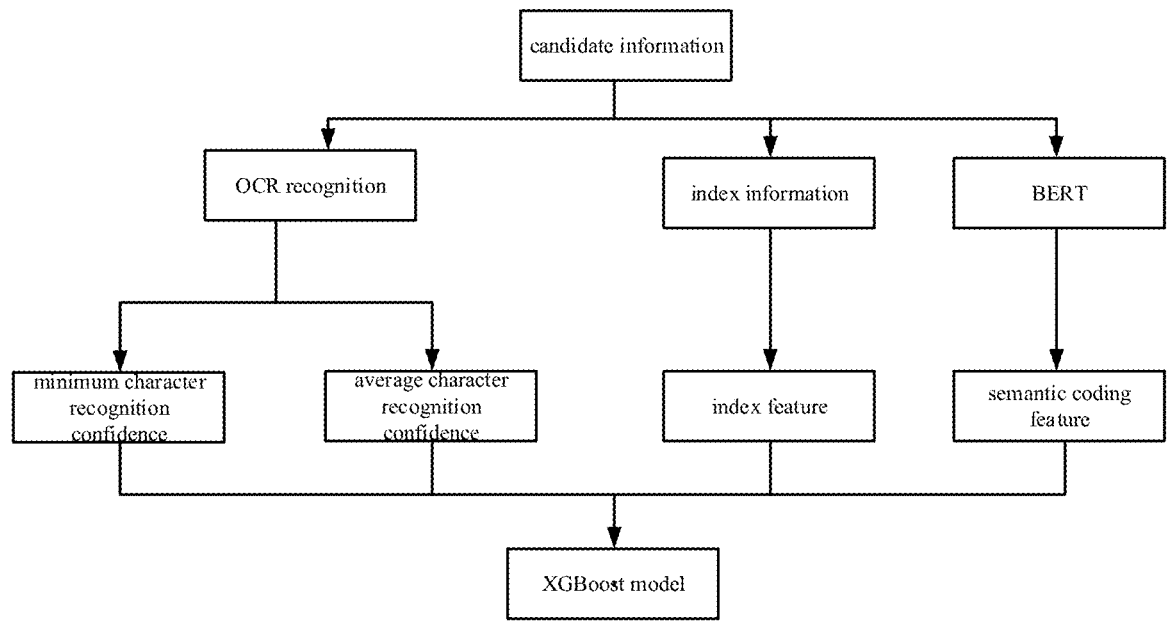
FIG. 5 is a flowchart of training a classification model in an embodiment of the disclosure.

In an embodiment of the disclosure, description may be made to this embodiment in combination with FIG. 5. FIG. 5 is a flowchart of training a classification model in an embodiment of the disclosure. As illustrated in FIG. 5, after the semantic coding feature, the type feature, the index feature, the minimum character recognition confidence and the average character recognition confidence of the candidate information are determined, the semantic coding feature, the type feature, the index feature, the minimum character recognition confidence and the average character recognition confidence may be together input into the pre-trained XGBoost model to obtain a classification evaluation value output by the XGBoost model.

At S411, the target information is determined from the at least one piece of candidate information based on the classification evaluation value corresponding to each piece of candidate information.

In an embodiment of the disclosure, after a plurality of classification evaluation values output by the XGBoost model are obtained, the target information may be determined from the multiple pieces of candidate information corresponding to the classification evaluation values based on the plurality of classification evaluation values. The target information is determined from multiple pieces of candidate information based on the XGBoost model, thus, massive recalled candidate information may be sorted based on the XGBoost model, and the most possible candidate information may be determined from the massive candidate information based on the sorting result, which greatly improves the accuracy of determining the target information.

For example, the multiple pieces of candidate information corresponding to the plurality of classification evaluation values may be sorted based on the size of the plurality of classification evaluation values, and a classification evaluation value with the highest value may be determined from the plurality of classification evaluation values, and the candidate information corresponding to the highest classification evaluation value may be taken as the target information, which is not limited here.

Figure 6:
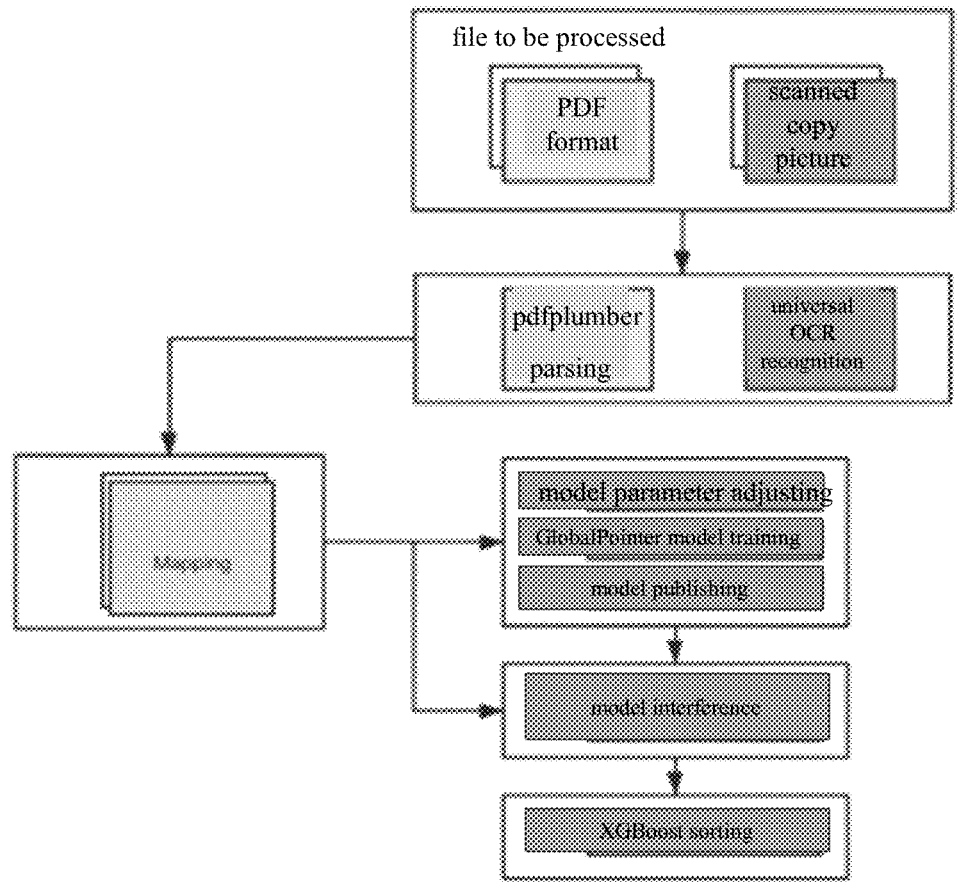
FIG. 6 is a schematic diagram of a structure of an apparatus for acquiring information in an embodiment of the disclosure.

In an embodiment, as illustrated in FIG. 6, FIG. 6 is a schematic diagram of a structure of an apparatus for acquiring information in an embodiment of the disclosure. After a file to be processed (for example, a PDF file or an image of a scanned copy) is acquired, text information of the file to be processed may be obtained by parsing the file to be processed using a PDF plumber and an OCR method. Then the obtained text information may be split in a data mapping manner, and text segments obtained by splitting the text information may be converted into a format required by model training, and the text segments having the format required by model training are input into a trained Global Pointer model for training. The Global Pointer model is trained through operations such as model parameter adjusting, Global Pointer model training and model publishing. In addition, candidate information may be recalled by performing model inference on the above obtained text segment (not performing format conversion), and OCR recognition features of the file to be processed may be recalled at the same time. Then the recalled candidate information and the OCR recognition features may be input into an XGBoost model, to determine target information from the multiple pieces of candidate information.

In an embodiment, the file to be processed and the information type are acquired, and at least one piece of candidate information related to the information type is recognized from the file to be processed, and the plurality of characters of each piece of candidate information is determined, and the character recognition confidences corresponding to the characters are determined, and the corresponding initial recognition features are determined based on the character recognition confidences, which may effectively enhance a possibility for referring to the initial recognition features, thereby having a more accurate information acquisition effect when performing an information acquisition method based on the initial recognition features subsequently. In addition, the minimum character recognition confidence of the plurality of character recognition confidences is determined, and the average character recognition confidence of the plurality of character recognition confidences is determined, so that when the minimum recognition confidence and the average recognition confidence are taken as the target recognition features, the target recognition features may accurately and comprehensively represent a character recognition condition, which effectively improves the performance of target recognition features. In addition, the index information corresponding to the information type is determined, the type feature corresponding to the information type and the index feature corresponding to the index information are determined, a semantic coding feature of candidate information is determined, and the type feature, index feature and semantic coding feature are taken as the semantic features, so that semantic features may comprehensively represent candidate information from multiple dimensions, and multi-dimensional information of the candidate information can be fully considered, thereby effectively guaranteeing that information acquired may be provided to a delivery indicator in the process of performing the method for acquiring information subsequently, which greatly improves the accuracy of determining target information.

Figure 7:
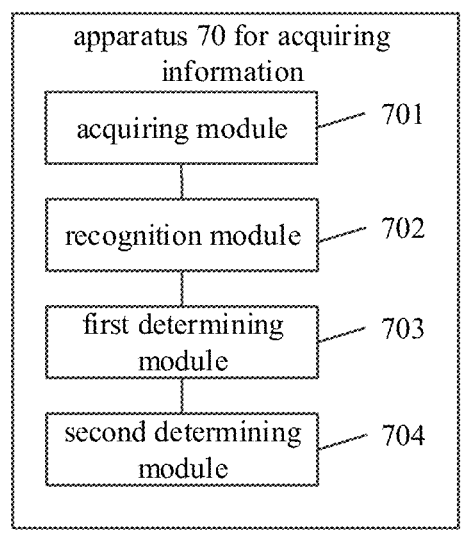
FIG. 7 is a block diagram of an apparatus for acquiring information according to an embodiment of the disclosure.

FIG. 7 is a block diagram of an apparatus for acquiring information according to an embodiment of the disclosure.

As illustrated in FIG. 7, the apparatus 70 for acquiring information includes an acquiring module 701, a recognition module 702, a first determining module 703 and a second determining module 704.

The acquiring module 701 is configured to acquire a file to be processed and an information type; the recognition module 702 is configured to recognize at least one piece of candidate information related to the information type from the file to be processed; the first determining module 703 is configured to determine a target recognition feature and a semantic feature of each piece of candidate information, the target recognition feature is configured to describe a matching condition between each piece of candidate information and the information type; and the second determining module 704 is configured to determine target information from the at least one piece of candidate information based on the target recognition feature and the semantic feature.

Figure 8:
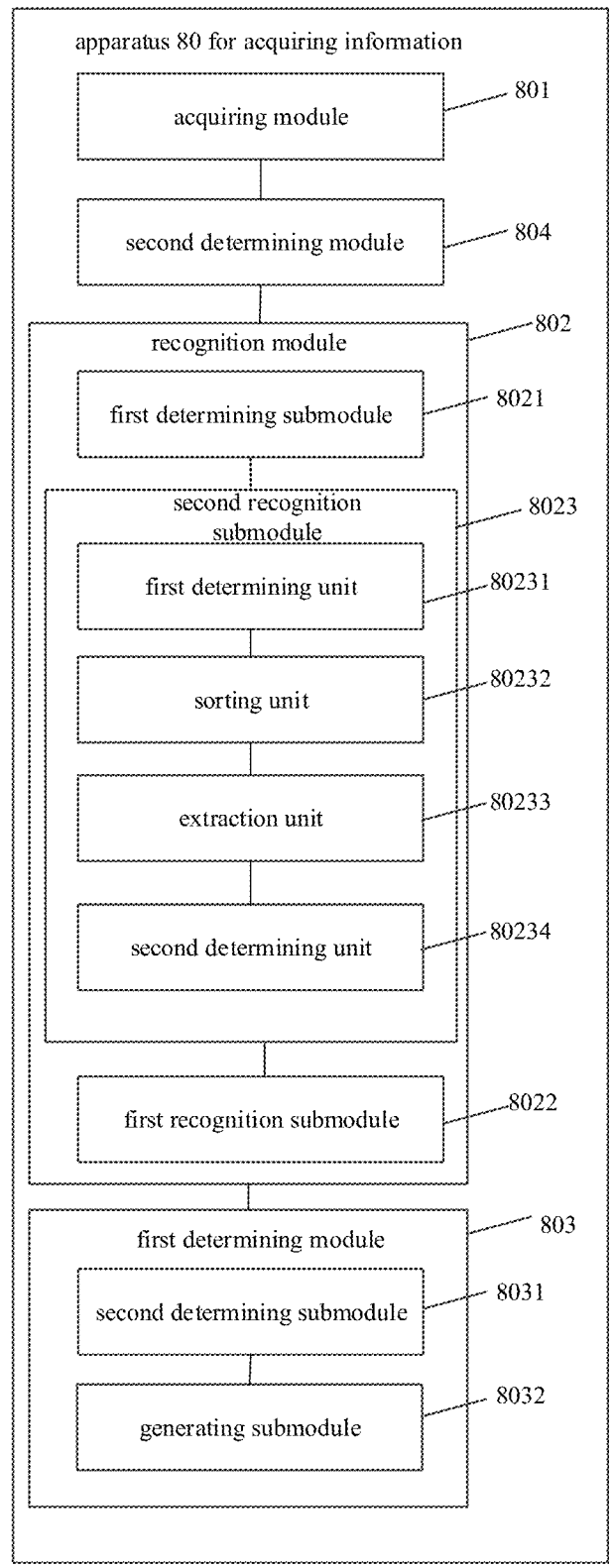
FIG. 8 is a block diagram of an apparatus for acquiring information according to an embodiment of the disclosure.

In some embodiments of the disclosure, as illustrated in FIG. 8, FIG. 8 is a block diagram of an apparatus for acquiring information according to an embodiment of the disclosure. The apparatus 80 for acquiring information includes an acquiring module 801, a recognition module 802, a first determining module 803 and a second determining module 804. The acquiring module 801 is further configured to: acquire an initial file; and obtain at least one file to be processed by splitting the initial file based on the threshold.

In some embodiments, the recognition module 802 is further configured to: recognize the at least one piece of candidate information related to the information type from the at least one file to be processed in a parallel processing manner.

In some embodiments of the disclosure, the recognition module 802 includes a first determining submodule 8021, a first recognition submodule 8022 and a second recognition submodule 8023.

The first determining submodule 8021 is configured to determine a text to be processed corresponding to the file to be processed; the first recognition submodule 8022 is configured to recognize at least one continuous text segment from the text to be processed; and the second recognition submodule 8023 is configured to recognize a continuous text segment matched with the information type from the at least one continuous text segment, and determine the continuous text segment matched with the information type as the candidate information.

In some embodiments of the disclosure, the second recognition submodule 8023 includes a first determining unit 80231, a sorting unit 80232 and an extraction unit 80233.

The first determining unit 80231 is configured to determine at least one semantic weight value respectively corresponding to the at least one continuous text segment; the sorting unit 80232 is configured to obtain at least one sorted continuous text segment by sorting the at least one continuous text segment based on the at least one semantic weight value; and the extraction unit 80233 is configured to extract a reference number of top sorted continuous text segments matched with the information type from the at least one continuous text segment after sorting.

In some embodiments of the disclosure, the second recognition submodule 8023 includes a second determining unit 80234.

The second determining unit 80234 is configured to determine the reference number based on the information type.

In some embodiments of the disclosure, the first determining unit 80231 is further configured to: determine an occurrence number of each continuous text segment in the text to be processed, and determine a semantic weight value corresponding to each continuous text segment based on the occurrence number of each continuous text segment.

In some embodiments of the disclosure, the first determining module 803 includes a second determining submodule 8031 and a generating submodule 8032.

The second determining submodule 8031 is configured to determine at least one initial recognition feature corresponding to the candidate information, the initial recognition feature is a probability that a type of the candidate information is the information type; and the generating submodule 8032 is configured to generate the target recognition feature based on the at least one initial recognition feature.

In some embodiments of the disclosure, the second determining submodule 8031 is further configured to: determine a plurality of characters of the candidate information; and determine a plurality of character recognition confidences respectively corresponding to the plurality of characters, and determining corresponding an initial recognition features based on each of the plurality of character recognition confidences.

In some embodiments of the disclosure, the generating submodule 8032 is further configured to: determine a minimum character recognition confidence among the plurality of character recognition confidences, and determine the minimum character recognition confidence as the target recognition feature; and/or determine an average character recognition confidence of the plurality of character recognition confidences, and determine the average character recognition confidence as the target recognition feature.

In some embodiments of the disclosure, the first determining module 803 is further configured to: determine index information corresponding to the information type, and determine an index feature corresponding to the index information, and determine the index feature as the semantic feature; and/or determine a type feature corresponding to the information type, and determine the type feature as the semantic feature; and/or determine a semantic coding feature of the candidate information, and determine the semantic coding feature as the semantic feature.

In some embodiments of the disclosure, the second determining module 804 is further configured to: input the minimum character recognition confidence, the average character recognition confidence, the type feature, the index feature, and the semantic coding feature into a pre-trained classification model, and obtain a classification evaluation value corresponding to each piece of the candidate information output by the classification model; and determine the target information from the at least one piece of candidate information based on each of the classification evaluation value corresponding to each piece of candidate information.

It is understandable that, in the apparatus 80 for acquiring information in FIG. 8 of the embodiment and the apparatus 70 for acquiring information in the above embodiment, the acquiring module 801 and the acquiring module 701 in the above embodiment have the same functions and structures, the recognition module 802 and the recognition module 702 in the above embodiment have the same functions and structures, the first determining module 803 and the first determining module 703 in the above embodiment have the same functions and structures, the second determining module 804 and the second determining module 704 in the above embodiment have the same functions and structures.

It needs to be noted that the foregoing explanation of the method for acquiring information is also applied to an apparatus for acquiring information in the embodiment, which will not be repeated here.

In the embodiment, the file to be processed and the information type are acquired, and at least one piece of candidate information related to the information type is recognized from the file to be processed, and the target recognition feature and the semantic feature of each piece of candidate information are determined, the target recognition feature is configured to describe the matching condition between the candidate information and the information type, and the target information is acquired from the at least one piece of candidate information based on the target recognition feature and the semantic feature, thereby effectively enhancing the applicability of the method for acquiring information.

According to the embodiment of the disclosure, an electronic device, a readable storage medium and a computer program product are further provided in the disclosure.

Figure 9:
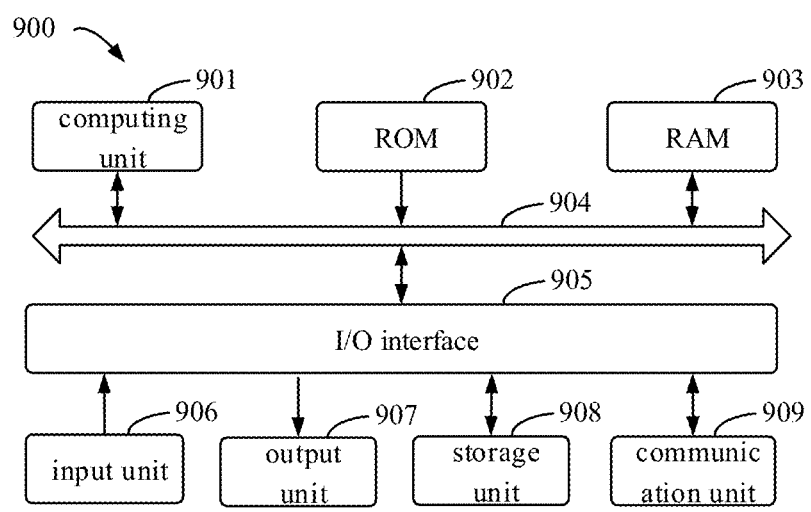
FIG. 9 illustrates a schematic diagram of an electronic device configured to implement the method for acquiring information according to an embodiment of the disclosure.

FIG. 9 illustrates a schematic diagram of an example electronic device configured to implement the method for acquiring information according to an embodiment of the disclosure. An electronic device is intended to represent various types of digital computers, such as laptop computers, desktop computers, workstations, personal digital assistants, servers, blade servers, mainframe computers, and other suitable computers. An electronic device may also represent various types of mobile apparatuses, such as personal digital assistants, cellular phones, smart phones, wearable devices, and other similar computing devices. The components shown herein, their connections and relations, and their functions are merely examples, and are not intended to limit the implementation of the disclosure described and/or required herein.

As illustrated in FIG. 9, the device 900 includes a computing unit 901, which may execute various appropriate actions and processings based on a computer program stored in a read-only memory (ROM) 902 or a computer program loaded into a random access memory (RAM) 903 from a storage unit 908. In the RAM 903, various programs and data required for operation of the device 900 may also be stored. The computing unit 901, the ROM 902, and the RAM 903 are connected to each other through a bus 904. An input/output (I/O) interface 905 is also connected to a bus 904.

Several components in the device 900 are connected to the I/O interface 905, and include: an input unit 906, for example, a keyboard, a mouse, etc.; an output unit 907, for example, various types of displays, speakers, etc.; a storage unit 908, for example, a magnetic disk, an optical disk, etc.; and a communication unit 909, for example, a network card, a modem, a wireless communication transceiver, etc. The communication unit 909 allows the device 900 to exchange information/data with other devices over a computer network such as the Internet and/or various telecommunication networks.

The computing unit 901 may be various general-purpose and/or special-purpose processing components with processing and computing capacities. Some examples of the computing unit 901 include but are not limited to a central processing unit (CPU), a graphics processing unit (GPU), various dedicated artificial intelligence (AI) computing chips, various computing chips running a machine learning model algorithm, a digital signal processor (DSP), and any suitable processor, controller, microcontroller, or etc. The computing unit 901 executes various methods and processings as described above, for example, a method for acquiring information. For example, in some embodiments, the method for acquiring information may be further achieved as a computer software program, which is physically contained in a machine readable medium, such as a storage unit 908. In some embodiments, some or all of the computer programs may be loaded and/or mounted on the device 900 via a ROM 902 and/or a communication unit 909. When the computer program is loaded on a RAM 903 and performed by a computing unit 901, one or more blocks in the above method for acquiring information may be performed. Alternatively, in other embodiments, a computing unit 901 may be configured to perform a method for acquiring information in other appropriate ways (for example, by virtue of a firmware).

Various implementation modes of the systems and technologies described above may be achieved in a digital electronic circuit system, a field programmable gate array (FPGA), an application-specific integrated circuit (ASIC), an application specific standard product (ASSP), a systemon-chip (SOC) system, a complex programmable logic device, a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

A computer code configured to execute a method in the present disclosure may be written with one or any combination of a plurality of programming languages. The programming languages may be provided to a processor or a controller of a general purpose computer, a dedicated computer, or other apparatuses for programmable data processing so that the function/operation specified in the flowchart and/or block diagram may be performed when the program code is executed by the processor or controller. A computer code may be performed completely or partly on the machine, performed partly on the machine as an independent software package and performed partly or completely on the remote machine or server.

In the context of the disclosure, a machine-readable medium may be a tangible medium that may contain or store a program intended for use in or in conjunction with an instruction execution system, apparatus, or device. A machine readable medium may be a machine readable signal medium or a machine readable storage medium. A machine readable storage medium may include but not limited to an electronic, magnetic, optical, electromagnetic, infrared, or semiconductor system, apparatus or device, or any appropriate combination thereof. A more specific example of a machine readable storage medium includes an electronic connector with one or more cables, a portable computer disk, a hardware, a random access memory (RAM), a read-only memory (ROM), an erasable programmable read-only memory (an EPROM or a flash memory), an optical fiber device, and a portable optical disk read-only memory (CDROM), an optical storage device, a magnetic storage device, or any appropriate combination of the above.

In order to provide interaction with the user, the systems and technologies described here may be implemented on a computer, and the computer has: a display apparatus for displaying information to the user (for example, a CRT (cathode ray tube) or a LCD (liquid crystal display) monitor); and a keyboard and a pointing apparatus (for example, a mouse or a trackball) through which the user may provide input to the computer. Other types of apparatuses may be further configured to provide interaction with the user; for example, the feedback provided to the user may be any form of sensory feedback (for example, visual feedback, auditory feedback, or tactile feedback); and input from the user may be received in any form (including an acoustic input, a voice input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN), an internet and a blockchain network.

The computer system may include a client and a server. The client and server are generally far away from each other and generally interact with each other through a communication network. The relationship between the client and the server is generated by computer programs running on the corresponding computer and having a client-server relationship with each other. A server may be a cloud server, also known as a cloud computing server or a cloud host, is a host product in a cloud computing service system, to solve the shortcomings of large management difficulty and weak business expansibility existed in the conventional physical host and Virtual Private Server (VPS) service. A server further may be a server with a distributed system, or a server in combination with a blockchain.

It should be understood that, various forms of procedures shown above may be configured to reorder, add or delete blocks. For example, blocks described in the disclosure may be executed in parallel, sequentially, or in different orders, as long as the desired result of the technical solution disclosed in the present disclosure may be achieved, which will not be limited herein.

The above specific implementations do not constitute a limitation on the protection scope of the disclosure. Those skilled in the art should understand that various modifications, combinations, sub-combinations and substitutions may be made according to design requirements and other factors. Any modification, equivalent replacement, improvement, etc., made within the spirit and principle of embodiments of the present disclosure shall be included within the protection scope of the present disclosure.

What is claimed is:

1. A method for file processing, comprising:
acquiring a file to be processed and an information type, wherein a data volume of the file to be processed is less than or equal to a threshold;
recognizing at least one piece of candidate information related to the information type from the file to be processed, wherein recognizing at least one piece of candidate information related to the information type from the file to be processed comprises:
recognizing the at least one piece of candidate information related to the information type from the at least one file to be processed in a parallel processing manner;
determining a target recognition feature and a semantic feature of each piece of candidate information, wherein the target recognition feature is configured to describe a matching condition between the each piece of candidate information and the information type; and
determining target information from the at least one piece of candidate information based on the target recognition feature and the semantic feature;
wherein determining target information from the at least one piece of candidate information based on the target recognition feature and the semantic feature comprises:
determining character recognition confidences corresponding to a plurality of characters,
inputting the minimum character recognition confidence, the average character recognition confidence, the type feature, the index feature, and the semantic coding feature into a pre-trained classification model, and obtaining a classification evaluation value corresponding to each piece of candidate information output by the classification model; and determining the target information from the at least one piece of candidate information based on the classification evaluation value corresponding to each piece of candidate information, wherein determining the character recognition confidences corresponding to a plurality of characters comprises:

obtaining recognition confidences corresponding to a plurality of characters by recognizing each character using an optical character recognition (OCR) method, and obtain the character recognition confidence of each of the plurality of characters;

wherein acquiring a file to be processed comprises:
acquiring an initial file; and
obtaining at least one file to be processed by splitting the initial file based on the threshold;

wherein execution of the foregoing steps converts the file to be processed from an unstructured Portable file Format (PDF) or image into structured target information corresponding to the information type, and stores the structured target information together with an index feature corresponding to the information type in an index table in memory.

2. The method of claim 1, wherein recognizing at least one piece of candidate information related to the information type from the file to be processed comprises:

determining a text to be processed corresponding to the file to be processed;

recognizing at least one continuous text segment from the text to be processed; and recognizing a continuous text segment matched with the information type from the at least one continuous text segment, and determining the continuous text segment matched with the information type as the candidate information.

3. The method of claim 2, wherein recognizing the continuous text segment matched with the information type from the at least one continuous text segment comprises:

determining at least one semantic weight value respectively corresponding to the at least one continuous text segment;

obtaining at least one sorted continuous text segment by sorting the at least one continuous text segment based on the at least one semantic weight value; and extracting a reference number of top sorted continuous text segments matched with the information type from the at least one sorted continuous text segment.

4. The method of claim 3, further comprising:
determining the reference number based on the information type.

5. The method of claim 3, wherein determining at least one semantic weight value respectively corresponding to the at least one continuous text segment comprises:

determining an occurrence number of each continuous text segment in the text to be processed, and determining a semantic weight value corresponding to each continuous text segment based on the occurrence number of each continuous text segment.

6. The method of claim 1, wherein determining a target recognition feature of each piece of candidate information comprises:

determining at least one initial recognition feature corresponding to the candidate information, wherein the initial recognition feature is a probability that a type of the candidate information is the information type; and generating the target recognition feature based on the at least one initial recognition feature.

7. The method of claim 6, wherein determining at least one initial recognition feature corresponding to the candidate information comprises:

determining a plurality of characters of the candidate information; and determining a plurality of character recognition confidences respectively corresponding to the plurality of characters, and determining an initial recognition feature based on each of the plurality of character recognition confidences.

8. The method of claim 7, wherein generating the target recognition feature based on the at least one initial recognition feature comprises:

determining a minimum character recognition confidence among the plurality of character recognition confidences, and determining the minimum character recognition confidence as the target recognition feature; and/or determining an average character recognition confidence of the plurality of character recognition confidences, and determining the average character recognition confidence as the target recognition feature.

9. The method of claim 1, wherein determining a semantic feature of each piece of candidate information comprises:

determining index information corresponding to the information type, determining an index feature corresponding to the index information, and determining the index feature as the semantic feature; and/or determining a type feature corresponding to the information type, and determining the type feature as the semantic feature; and/or determining a semantic coding feature of the candidate information, and determining the semantic coding feature as the semantic feature.

10. An electronic device, comprising:
at least one processor; and
a memory communicatively connected to the at least one processor; wherein, the memory is stored with instructions executable by the at least one processor, the instructions are performed by the at least one processor, to cause the at least one processor to perform a method for file processing, the method comprising:

acquiring a file to be processed and an information type, wherein a data volume of the file to be processed is less than or equal to a threshold;

recognizing at least one piece of candidate information related to the information type from the file to be processed, wherein recognizing at least one piece of candidate information related to the information type from the file to be processed comprises:

recognizing the at least one piece of candidate information related to the information type from the at least one file to be processed in a parallel processing manner;

determining a target recognition feature and a semantic feature of each piece of candidate information, wherein the target recognition feature is configured to describe a matching condition between the each piece of candidate information and the information type; and determining target information from the at least one piece of candidate information based on the target recognition feature and the semantic feature, wherein determining target information from the at least one piece of candidate information based on the target recognition feature and the semantic feature comprises:
determining character recognition confidences corresponding to a plurality of characters,
inputting the minimum character recognition confidence, the average character recognition confidence, the type feature, the index feature, and the semantic coding feature into a pre-trained classification model, and obtaining a classification evaluation value corresponding to each piece of candidate information output by the classification model; and
determining the target information from the at least one piece of candidate information based on the classification evaluation value corresponding to each piece of candidate information,
wherein determining the character recognition confidences corresponding to a plurality of characters comprises:
obtaining recognition confidences corresponding to a plurality of characters by recognizing each character using an optical character recognition (OCR) method, and obtain the character recognition confidence of each of the plurality of characters;
wherein acquiring a file to be processed comprises:
acquiring an initial file; and
obtaining at least one file to be processed by splitting the initial file based on the threshold;
wherein execution of the foregoing steps performed by the processor converts the file to be processed from an unstructured Portable file Format (PDF) or image into structured target information corresponding to the information type, and stores the structured target information together with an index feature corresponding to the information type in an index table in memory.

11. The electronic device of claim 10, wherein recognizing at least one piece of candidate information related to the information type from the file to be processed comprises:
determining a text to be processed corresponding to the file to be processed;
recognizing at least one continuous text segment from the text to be processed; and
recognizing a continuous text segment matched with the information type from the at least one continuous text segment, and determining the continuous text segment matched with the information type as the candidate information.

12. The electronic device of claim 11, wherein recognizing the continuous text segment matched with the information type from the at least one continuous text segment comprises:
determining at least one semantic weight value respectively corresponding to the at least one continuous text segment;
obtaining at least one sorted continuous text segment by sorting the at least one continuous text segment based on the at least one semantic weight value; and
extracting a reference number of top sorted continuous text segments matched with the information type from the at least one sorted continuous text segment.

13. The electronic device of claim 12, further comprising:
determining the reference number based on the information type.

14. The method of claim 12, wherein determining at least one semantic weight value respectively corresponding to the at least one continuous text segment comprises:

determining an occurrence number of each continuous text segment in the text to be processed, and determining a semantic weight value corresponding to each continuous text segment based on the occurrence number of each continuous text segment.

15. A non-transitory computer readable storage medium stored with computer instructions, wherein, the computer instructions are configured to cause a computer to perform a method for file processing, the method comprising:
acquiring a file to be processed and an information type, wherein a data volume of the file to be processed is less than or equal to a threshold;
recognizing at least one piece of candidate information related to the information type from the file to be processed, wherein recognizing at least one piece of candidate information related to the information type from the file to be processed comprises:
recognizing the at least one piece of candidate information related to the information type from the at least one file to be processed in a parallel processing manner;
determining a target recognition feature and a semantic feature of each piece of candidate information, wherein the target recognition feature is configured to describe a matching condition between the each piece of candidate information and the information type; and
determining target information from the at least one piece of candidate information based on the target recognition feature and the semantic feature,
wherein determining target information from the at least one piece of candidate information based on the target recognition feature and the semantic feature comprises:
determining character recognition confidences corresponding to a plurality of characters,
inputting the minimum character recognition confidence, the average character recognition confidence, the type feature, the index feature, and the semantic coding feature into a pre-trained classification model, and obtaining a classification evaluation value corresponding to each piece of candidate information output by the classification model; and
determining the target information from the at least one piece of candidate information based on the classification evaluation value corresponding to each piece of candidate information,
wherein determining the character recognition confidences corresponding to a plurality of characters comprises:
obtaining recognition confidences corresponding to a plurality of characters by recognizing each character using an optical character recognition (OCR) method, and obtain the character recognition confidence of each of the plurality of characters;
wherein acquiring a file to be processed comprises:
acquiring an initial file; and
obtaining at least one file to be processed by splitting the initial file based on the threshold;
wherein execution of the foregoing steps converts the file to be processed from an unstructured Portable file Format (PDF) or image into structured target information corresponding to the information type, and stores the structured target information together with an index feature corresponding to the information type in an index table in memory.

\* \* \* \* \*